US008510551B1

(12) United States Patent
Desai et al.

(10) Patent No.: US 8,510,551 B1
(45) Date of Patent: Aug. 13, 2013

(54) POLICY HANDLING FOR MULTICAST TRANSMISSIONS

(75) Inventors: Purvi Desai, Cupertino, CA (US); Kannan Varadhan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 725 days.

(21) Appl. No.: 12/267,938

(22) Filed: Nov. 10, 2008

(51) Int. Cl.
    *H04L 29/06* (2006.01)

(52) U.S. Cl.
    USPC ........... 713/163; 713/150; 713/152; 713/160; 713/162; 726/1; 726/3; 709/224; 709/227; 709/228; 709/229; 709/232

(58) Field of Classification Search
    USPC ........... 713/150–194; 726/1–36; 380/1–287
    See application file for complete search history.

(56) References Cited

U.S. PATENT DOCUMENTS

| 7,188,173 | B2* | 3/2007 | Anderson et al. | 709/225 |
| 7,281,058 | B1* | 10/2007 | Shepherd et al. | 709/238 |
| 7,333,484 | B2* | 2/2008 | Henderson et al. | 370/389 |
| 7,587,591 | B2* | 9/2009 | Lebovitz et al. | 713/163 |
| 7,693,146 | B2* | 4/2010 | Subramanian | 370/390 |
| 8,132,000 | B2* | 3/2012 | Lebovitz et al. | 713/163 |
| 2005/0076207 | A1* | 4/2005 | Park et al. | 713/163 |
| 2005/0114656 | A1* | 5/2005 | Liu et al. | 713/163 |
| 2005/0138369 | A1* | 6/2005 | Lebovitz et al. | 713/163 |
| 2005/0190765 | A1* | 9/2005 | Gotoh et al. | 370/390 |
| 2009/0292917 | A1* | 11/2009 | Lebovitz et al. | 713/160 |
| 2010/0043067 | A1* | 2/2010 | Varadhan et al. | 726/13 |
| 2010/0195529 | A1* | 8/2010 | Liu et al. | 370/252 |
| 2011/0213869 | A1* | 9/2011 | Korsunsky et al. | 709/223 |
| 2011/0214157 | A1* | 9/2011 | Korsunsky et al. | 726/1 |
| 2012/0144191 | A1* | 6/2012 | Lebovitz et al. | 713/163 |

FOREIGN PATENT DOCUMENTS

WO WO 2008071111 A1 * 6/2008

OTHER PUBLICATIONS

Fenner et al, Protocol Independent Multicast—Sparse Mode (PIM-SM) Protocol Specification (Revised), Aug. 2006.*
Estrin, Protocol Independent Multicast-Sparse Mode (PIM-SM) : Protocol Specification, Jun. 1998, The Internet Society, p. 40.*
Internet Protocol RFC 791, Sep. 1981, pp. 10 and 13.*

* cited by examiner

*Primary Examiner* — Nathan Flynn
*Assistant Examiner* — Michael R Vaughan
(74) *Attorney, Agent, or Firm* — Harrity & Harrity, LLP

(57) ABSTRACT

A device, receives a unicast packet designating a unicast source and a unicast destination, and determines whether the received unicast packet is a Data Register message. The device extracts information relating to a multicast packet encapsulated within the unicast packet when the unicast packet is a Data Register message, and performs a security policy lookup based on the extracted multicast packet information to identify a security policy associated with the multicast packet. The device determines whether the identified security policy authorizes forwarding of the unicast packet, and establishes a multicast data session when the identified security policy authorizes forwarding of the unicast packet. The device establishes a multicast control session based on the multicast data session, where the multicast control session authorizes transmission of PIM-related control messages associated with the multicast packet. The device forwards the unicast packet to the unicast destination based on the multicast data session.

20 Claims, 8 Drawing Sheets

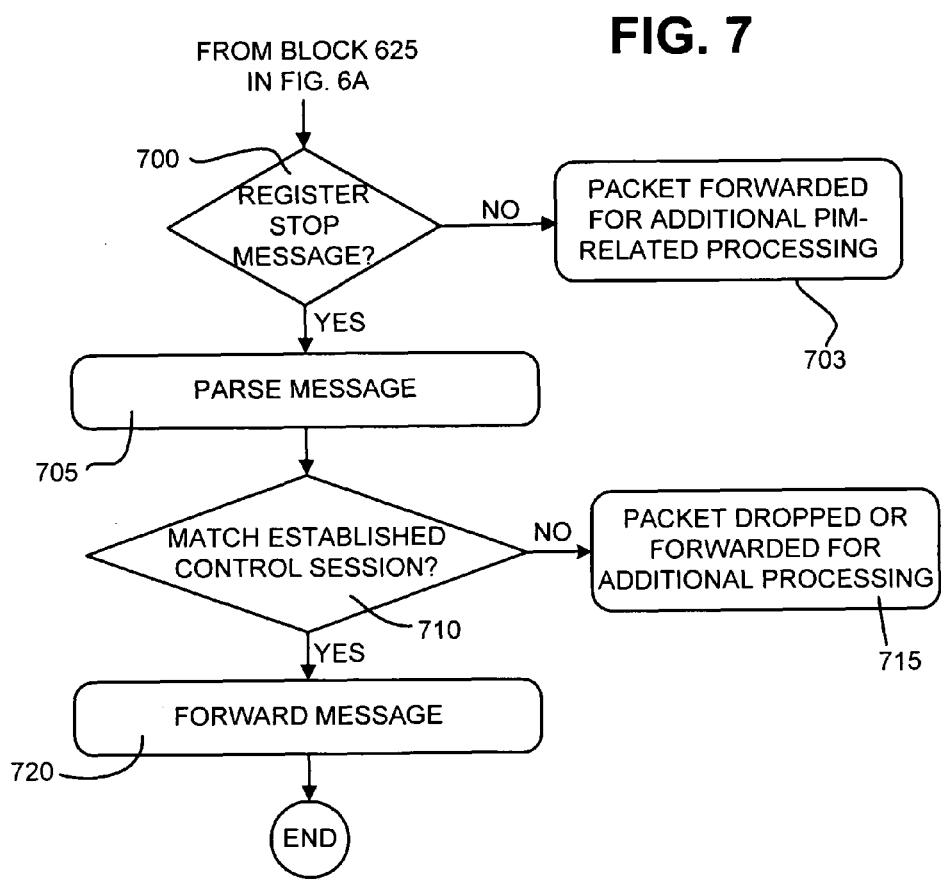

POLICY HANDLING FOR MULTICAST TRANSMISSIONS

BACKGROUND

Network computing applications involving groups of computers may require simultaneous communication. There are three conventional ways to design a network application for simultaneous group communication: unicast, broadcast, and multicast. Conventional unicast systems require the transmission of a copy of each data packet to one specific recipient. In order to transmit to multiple recipients, a separate connection is made with each recipient. Making multiple direct connections requires a large amount of bandwidth as the number of recipients increases and may result in delays since the same packet must be repeatedly copied and then transmitted to each recipient. In a conventional broadcast system, one copy of each packet is sent to a broadcast address. The broadcast transmission is sent to a large number of people when only a small number actually wish or need to receive the broadcast.

With a conventional multicast system, a network application may send one copy of a packet or packets addressed toward a group of recipients instead of just one recipient as in unicast systems. A network or networks are then responsible for forwarding the packet(s) on toward the necessary recipients. Multicast typically uses a standardized range of destination Internet Protocol (IP) addresses (e.g., 224.0.0.0-239.255.255.255). A multicast source signals the rest of a network to a multicast transmission by setting the destination IP address for a packet within the range of multicast destination IP addresses. The multicast destination IP address used is the multicast group address.

Protocol Independent Multicast-Sparse Mode (PIM-SM) is a control paradigm for multicast transmission. In a PIM-SM system, a multicast source transmits a multicast data packet to a PIM-SM-enabled router (referred to as a Designated Router or DR). The DR encapsulates the received multicast data into a unicast Data Register message. The unicast Data Register message is unicast transmitted from the DR to a rendezvous point (RP) router. The RP router unencapsulates the Data Register message and forwards the multicast data to registered members of the multicast group (discussed below). Once the RP router has identified the multicast data from the DR, it may transmit a Register Stop message to the DR indicating that it is no longer necessary to send unicast data messages to the RP router. Once the DR receives the Register Stop message, it then transmits unencapsulated multicast data directly to the RP router for transmitting to multicast group members.

The DR also periodically transmits a Null Register message to the RP router. Upon receipt of a Null Register message, the RP router again determines whether a multicast group participation has been requested on the RP router or, for an established group, whether the RP router is already receiving unencapsulated multicast data directly. If either of these conditions is met, the RP router sends a Register Stop message to the DR indicating that additional encapsulated unicast Data Register messages are not required. However, if the conditions are not met, a Register Stop message is not sent to the DR and the DR will again begin transmitting encapsulated unicast Data Register messages to the RP router.

On the recipient side of a PIM-SM system, a multicast recipient requests participation in a group transmission by signaling to a closest router, e.g., using the Internet Group Management Protocol (IGMP). The last-hop router uses PIM-SM to request the particular multicast stream from the next-hop routers and up to the RP router. Therefore, under a PIM-SM system, multicast packets only go where requested.

FIG. 1 illustrates an example of a conventional PIM-SM system that includes a multicast source 110, a designated router 115, a multicast-enabled router 120, last-hop routers 125a-125c (collectively "125"), a rendezvous point (RP) 130, and recipients 140a-140d (collectively "140"). Referring to FIG. 1, multicast recipients 140 may signal last-hop routers 125 that they would like a particular transmission. Last-hop routers 125 may send a join request for multicast transmission to RP 130 through multicast-enabled router 120. Different RPs may exist for different multicast group transmissions. Last-hop routers 125 may determine to which RP to send the join request for a particular multicast transmission. Last-hop routers 125 make connect to RP 130 for access to the source multicast stream instead of transmitting the join request directly to multicast source 110 when, for example, they do not know where the source is. As described above, RP 130 receives the multicast data from multicast source 110 through designated router 115 and one or more intermediary nodes such as multicast-enabled router 120, and distributes the multicast data toward all multicast recipients 140 subscribed to the multicast group.

SUMMARY

According to one implementation described herein, a method may include receiving a unicast packet designating a unicast source and a unicast destination; determining whether the unicast packet is a Data Register message; identifying information relating to a multicast packet embedded within the unicast packet when the unicast packet is a Data Register message; performing a security policy lookup based on the identified multicast packet information to identify a security policy associated with the multicast packet; determining whether the identified security policy authorizes forwarding of the unicast packet; establishing a multicast data session when the identified security policy authorizes forwarding of the unicast packet; and forwarding the unicast packet to the unicast destination based on the multicast data session.

According to another implementation, a device for handling multicast-related data may include a first interface to receive a unicast packet designating a unicast source and a unicast destination; a processor to determine whether the unicast packet is a Data Register message, where the Data Register message comprises a multicast packet encapsulated within the unicast packet; extract packet flow information relating to the multicast packet when the unicast packet is a Data Register message; perform a policy lookup based on the identified multicast packet flow information to identify a policy associated with the multicast packet; determine whether the identified policy authorizes forwarding of the unicast packet; establish a multicast data session when the identified policy authorizes forwarding of the unicast packet; and a second interface to forward the unicast packet to the unicast destination based on the multicast data session.

According to yet another implementation, a system may include a first network device associated with a multicast source on a first network; and a second network device associated with a multicast group on a second network; and a network security device positioned between the first network device and the second network device. The network security device is configured to receive, from the first network device, a unicast packet destined for the second network device; determine whether the received unicast packet is a Data Register message; extracting information relating to a multicast packet encapsulated within the unicast packet when the unicast packet is a Data Register message; perform a security policy lookup based on the extracted multicast packet information to identify a security policy associated with the multicast packet; determine whether the identified security policy authorizes forwarding of the unicast packet; establish a multicast data session when the identified security policy authorizes forwarding of the unicast packet; establish a multicast control session based on the multicast data session, where the multicast control session authorizes transmission of PIM-related control messages associated with the multicast packet; and forward the unicast packet to the unicast destination based on the multicast data session.

BRIEF DESCRIPTION OF DRAWINGS

The accompanying drawings, which are incorporated in and constitute a part of this specification, illustrate an implementation of the invention and, together with the description, explain the invention. In the drawings.

FIGS. 6A-7 are flow diagrams illustrating an exemplary process for implementing security policies on multicast data and control messages, according to implementations described herein.

DETAILED DESCRIPTION

The following detailed description of the invention refers to the accompanying drawings. The same reference numbers in different drawings may identify the same or similar elements. Also, the following detailed description does not limit the invention.

As described herein, a network security device may facilitate a secure multicast transmission session. The network security device may perform policy searching on a multicast portion of an encapsulated data register message. When a matching policy is identified, an initial security session may be created based on contents of the multicast portion of the encapsulated data register message. In addition, a second parent or higher-level security session may be created to further facilitate transmission of control messages relating to the multicast transmission.

Exemplary System Overview

Figure 1:
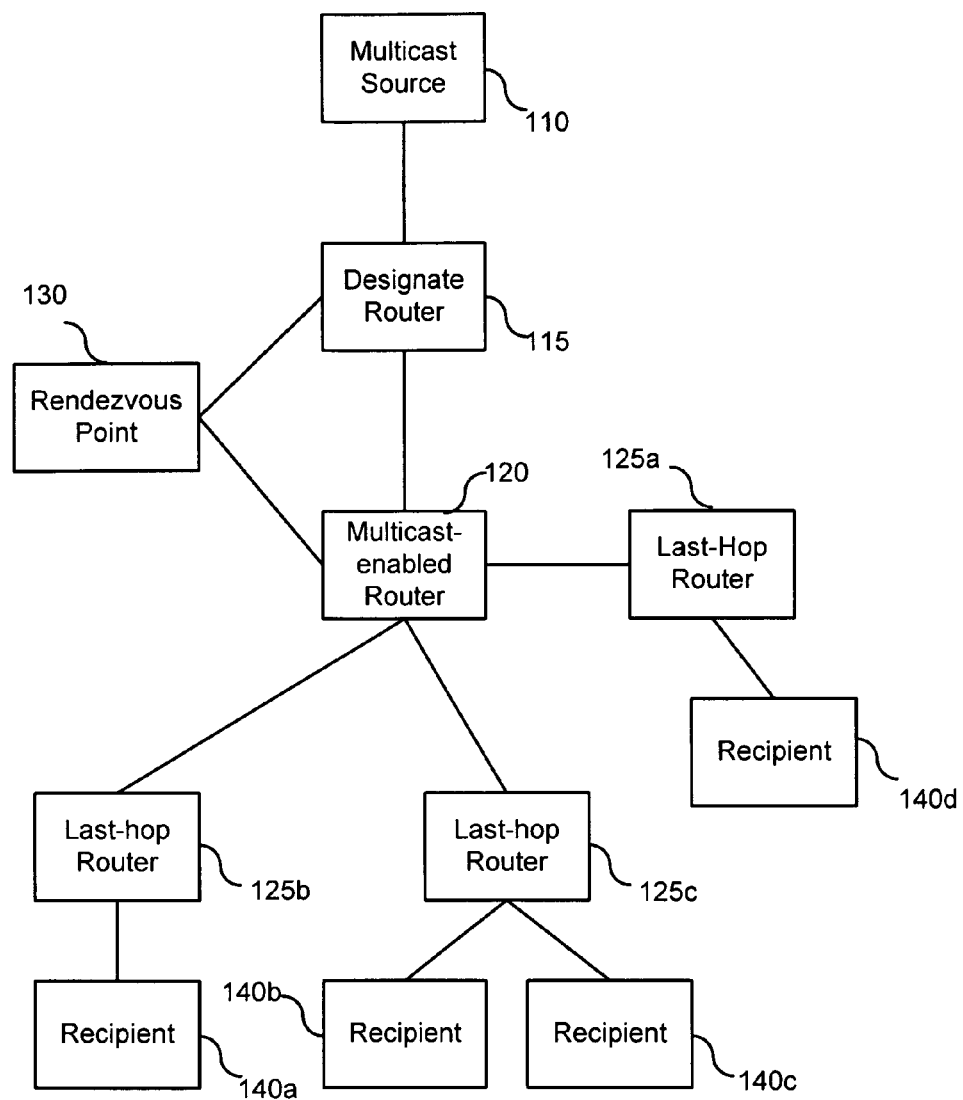
FIG. 1 is a schematic illustration of a conventional multicast system using a rendezvous point.
Figure 2:
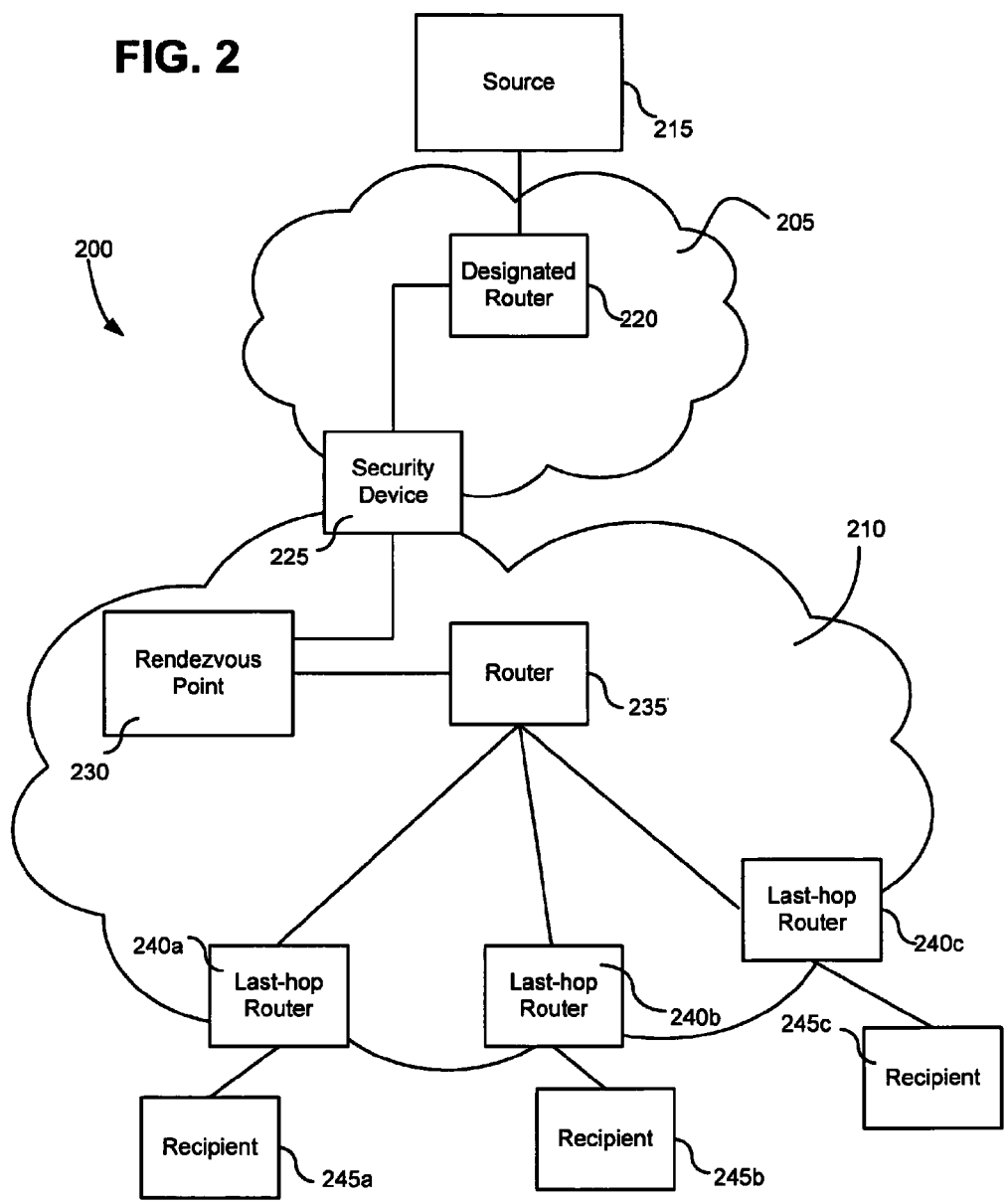
FIG. 2 is a block diagram illustrating an exemplary network configured in accordance with implementations described herein.

FIG. 2 is a block diagram illustrating an exemplary network 200 configured in accordance with implementations described herein. As illustrated, network 200 may include a private network 205, a second network 210, a multicast source 215, a first-hop or designated router (DR) 220, a network security device 225, a rendezvous point (RP) 230, an intermediate router 235, a number of last-hop routers 240a, 240b, and 240c (collectively "last-hop routers 240" or individually "last-hop router 240"), and a number of multicast recipients 245a, 245b, and 245c (collectively "multicast recipients 245" or individually "multicast recipient 245"). Components of network 200 may interconnect via wired and/or wireless connections. A single multicast source, designated router, network security device, rendezvous point, and intermediate router have been illustrated in FIG. 1 for simplicity. Additionally, three last-hop routers and three multicast recipients have also been illustrated in FIG. 1 for simplicity. In practice, there may be more than a single multicast source, designated router, network security device activation server, rendezvous point, and/or intermediate router. Additionally, there may be more than three last-hop routers and three multicast recipients. In some instances, one or more of the components of network 200 may perform one or more functions described as being performed by another one or more of the components of network 200.

In one implementation described herein, network 200 may be configured to enable PIM-based multicast distribution of data from multicast source 215 to multicast recipients 240 across networks 205 and 210. More specifically, multicast source 215 may distribute multicast data to designated router (DR) 220. In some implementations, one or more intermediate multicast-enabled routers (not shown) may be traversed prior to the multicast data reaching DR 220. Multicast source 215 may include one or more server entities, or other types of computation or communication devices, that gather, process, and/or provide information in a manner described herein. In one implementation, multicast source 215 may include a server (e.g., a computer system or an application) capable of formatting data for transmission into a multicast packet format.

In network environments bridging two or more networks (e.g., private network 205 and network 210), network security device 225 may manage data flow between the two networks. In one implementation, network security device 225 may include a firewall or other security-enabled routing device configured to provide and enforce security policies on data transmitted between networks 205 and 210, so as to restrict access to or protect devices on, for example, network 205. In other implementations, the functions of network security device 225 may be incorporated into DR 220 or RP 230. Additional details relating to functions and operation of network security device 225 are set forth in additional detail below.

Once RP 230 has received a unicast Data Register message from DR 230 (via, e.g., security device 225), RP 230 may announce a multicast transmission to multicast recipients 345 (via multicast-enabled intermediate router(s) 235 and last-hop routers 240). Last-hop routers 340 may transmit Join Request messages from recipients 245 to RP 230 in order to receive the multicast transmission from multicast source 215 through RP 230.

Figure 3A:
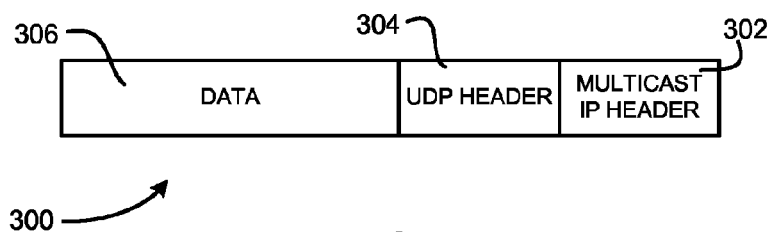
FIG. 3A illustrates an exemplary multicast packet.

FIG. 3A illustrates an exemplary multicast packet 300 received by DR 220. As shown in FIG. 3A, multicast packet 300 may include a UDP (user datagram protocol) header 304, a multicast IP header 302, and a data payload 306. UDP header 304 may include (among other things) a source port and a destination port associated with multicast packet 300. Multicast IP header 302 may include (among other things) a source IP address associated with multicast source 215, a destination IP address associated with the multicast group to which the multicast data is being transmitted, and a protocol identification. Data payload 306 may include the multicast data to be transmitted to the multicast group.

As briefly described above, in multicast networks implementing PIM-Sparse Mode, DR 220 may transmit multicast data received from connected multicast source 215 to a rendezvous point (e.g., RP 230) for distribution to end multicast recipients (e.g., recipients 245) via a group tree associated with RP 230. During initial transmissions of multicast data, DR 220 may encapsulate the received multicast packets as Data Register messages that may be unicast to RP 230.

Figure 3B:
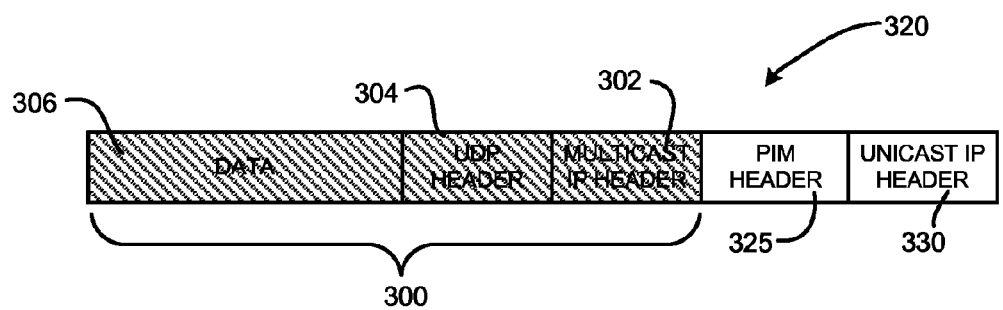
FIG. 3B illustrates an exemplary unicast Data Register message packet.

FIG. 3B illustrates an exemplary encapsulated unicast Data Register message packet 320. As shown in FIG. 3B, a PIM header 325 and a Unicast IP header 330 may be appended to original multicast packet 300. PIM header 325 may include (among other things) a PIM version indication, and a Type indication (indicating a Register message in packet 320). Unicast IP header 330 may include (among other things) a source IP address associated with DR 220 and a destination IP address associated RP 230.

PIM Data Register, Register-Stop, Null Register, Join Request, Prune, and Boot Strap Router messages may be transferred in the control plane. Signaling may occur and routing protocols may be executed in the control plane. The control plane may include protocols, such as PIM-SM, that build up the data plane. The data plane, also called the forwarding plane, may include the actual transmission of data across a network. For example, when one of multicast last hop routers 240 transmits a Join Request message to RP 230, a path may be built at the control plane level between RP 230 and that last-hop router 240. The actual multicast transmission from RP 230 toward multicast recipient 245 may occur at the data plane over the path created at the control plane. Though the examples given in this application are for PIM and PIM-SM, any multicast routing protocol's control messages may apply in a manner consistent with implementations described herein. Data plane messages may include the actual content or media stream of a multicast transmission and may be hereinafter referred to as media transmissions.

Details will now be set forth relating specifically to Data Register messages transmitted from DR 220 to RP 230. Because these Data Register messages may include multicast packets encapsulated into unicast packets designating proxy source and destination IP addresses (e.g., DR 220 and RP 230), traditional security devices may perform policy analysis only on the header information associated with the unicast packet (e.g., packet 320) and not on the underlying multicast data (e.g., packet 300) that is encapsulated within the unicast packet. This may result in unauthorized transmission of data outside of network 205. Furthermore, security sessions established based on unicast Data Register packets may not support or enable receipt of reply messages received from RP 230 (e.g., Register Stop messages, etc.) or follow-up control plane messages, such as, for example, Null Register messages, etc.

Network security device 225 may be configured to identify a flow and/or security policy (or policies) associated with the multicast data included within the unicast Data Register message packets. Network security device 225 may establish security sessions suitable for enabling transmission of the Data Register messages and related control plane messages between DR 220 and RP 230.

Figure 4:
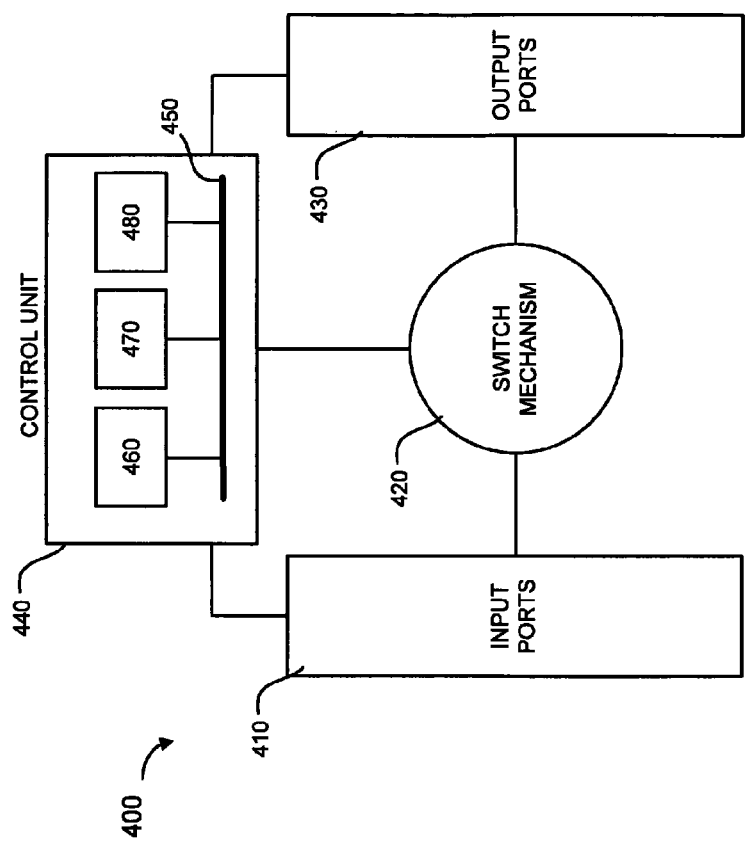
FIG. 4 depicts exemplary components of a multicast source, designated router, network security device, rendezvous point, intermediate router, last-hop router, and/or multicast recipient of the network illustrated in FIG. 2.

FIG. 4 is an exemplary diagram of a network device 400 that may correspond to any of designated router 220, network security device 225, rendezvous point 230, intermediate router 235, and/or last-hop router 240 in FIG. 2. Network device 400 may include input ports 410, a switching mechanism 420, output ports 430, and a control unit 440. Input ports 410 may be the points of attachments for physical links (not shown) and may be the points of entry for incoming service requests. Switching mechanism 420 may interconnect input ports 410 with output ports 430. Output ports 430 may store the service requests and may schedule the requests for service on one or more output links (not shown). Control unit 440 may participate in routing protocols and may create a forwarding table that is used in service forwarding.

Input ports 410 may carry out datalink layer encapsulation and decapsulation. Input ports 410 may look up a destination address of an incoming datagram (e.g., any type or form of data, such as packet or non-packet data) in a forwarding table to determine its destination port (i.e., route lookup). In order to provide QoS guarantees, input ports 410 may classify datagrams into predefined service classes. Input ports 410 may run datalink-level protocols or network-level protocols.

Switching mechanism 420 may be implemented using many different techniques. For example, switching mechanism 420 may include busses, crossbars, and/or shared memories. The simplest switching mechanism 420 may be a bus that links input ports 410 and output ports 430. A crossbar may provide multiple simultaneous data paths through switching mechanism 420. In a shared-memory switching mechanism 420, incoming datagrams may be stored in a shared memory and pointers to datagrams may be switched.

Output ports 430 may store datagrams before they are transmitted on an output link. Output ports 430 may include scheduling algorithms that support priorities and guarantees. Output ports 430 may support datalink layer encapsulation and decapsulation, and/or a variety of higher-level protocols.

Control unit 440 may interconnect with input ports 410, switching mechanism 420, and output ports 430. Control unit 440 may compute a forwarding table, implement routing protocols, and/or run software to configure and manage network device 400. Control unit 440 may handle any datagram whose destination address may not be found in the forwarding table.

In one implementation, control unit 440 may include a bus 450 that may include a path that permits communication among a processor 460, a memory 470, and a communication interface 480. Processor 460 may include a microprocessor or processing logic (e.g., an application specific integrated circuit (ASIC), field programmable gate array (FPGA), etc.) that may interpret and execute instructions. Memory 470 may include a random access memory (RAM), a read only memory (ROM) device, a magnetic and/or optical recording medium and its corresponding drive, and/or another type of static and/or dynamic storage device that may store information and instructions for execution by processor 460. Communication interface 480 may include any transceiver-like mechanism that enables control unit 440 to communicate with other devices and/or systems.

Control unit 440 (e.g., memory 470) may include one or more kernels as components of an operating system. A kernel may manage the components of network device 400, and may manage communication between hardware and software components of network device 400. The kernel may provide an abstraction layer for components of network device 400 (e.g., input ports 410, output ports 420, processor 460, and memory 470) that applications may control to perform a service or function. In one implementation, the kernel may provide one or more daemons to manage one or more components of network device 400, and/or provide services from network device 400.

A "daemon," as the term is used herein, is to be broadly interpreted to include any type of daemon capable of being utilized by network device 400. A daemon may include, for example, a process that handles any periodic service request that network device 400 may expect to receive, a process that forwards service requests to other processes performed by network device 400, a process that responds to service requests, hardware activity, or other processes by performing some task, etc. In one example, network device 400 may include a protocol daemon (e.g., an SSH daemon) capable of providing authentication and/or encryption, and a service daemon capable of providing services performable by network device 400.

Network device 400 may perform certain operations, as described in detail below. Network device 400 may perform these operations in response to processor 460 executing software instructions contained in a computer-readable medium, such as memory 470. A computer-readable medium may be defined as a physical and/or logical memory device.

The software instructions may be read into memory 470 from another computer-readable medium, such as a data storage device, or from another device via communication interface 480. The software instructions contained in memory 470 may cause processor 460 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of network device 400, in other implementations, network device 400 may contain fewer, different, or additional components than depicted in FIG. 4. In still other implementations, one or more components of network device 400 may perform the tasks performed by one or more other components of network device 400.

Figure 5:
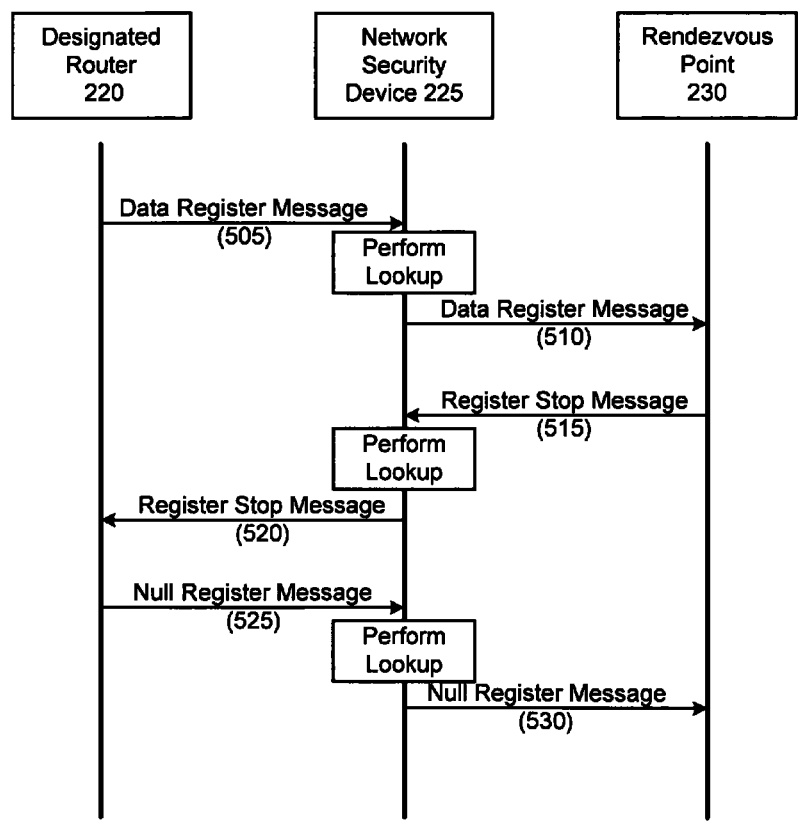
FIG. 5 is a messaging diagram illustrating exemplary message transmissions between the designated router, the network security device, and the rendezvous point of FIG. 2.

FIG. 5 is a messaging diagram illustrating exemplary message transmissions between DR 220, network security device 225, and RP 230. As described above, upon receipt of multicast packet (from, e.g., multicast source 215), DR 220 may form a Data Register message by adding a suitable PIM header to the multicast packet and may encapsulate the multicast packet and the PIM header into a unicast packet for delivery to RP 230. As described above, the unicast packet may include a source IP address associated with DR 220 and a destination IP address associated with RP 230. The unicast Data Register packet may then be forwarded to network security device 225 (message 505) for security processing and eventual transmission to RP 230.

Network security device 225 may perform an analysis on the received unicast packet to determine whether the received unicast packet is a PIM control message and whether the PIM control message is a Data Register message. When network security device 225 determines that the received unicast packet is a Data Register message, network security device 225 may parse the unicast packet to identify the packet flow information included therein relating to the multicast data. This information may be referred to as the multicast tuple and may include the source IP address, the multicast group destination IP address, the source port, the destination port, and the protocol identifier associated with the encapsulated multicast packet.

Once the multicast tuple has been identified from within the unicast packet, network security device 225 may perform a flow/policy lookup based on the multicast tuple. In one implementation, security policy information may be stored in a policy table based on the tuple information associated with data to which the policy should be applied. In some embodiments, entries in the policy table may be associated with flow identifiers corresponding to one or more tuples of information. For example, flow identifiers may include a hash of the tuple information associated with a number of data packets.

Based on the policy lookup and forwarding decision based thereon, a multicast data session may be established that includes the multicast source and the multicast group and based on the tuple information associated with the multicast data. Although the established session may facilitate transmission of data register messages between DR 220 and RP 230, transmission of other types of multicast control messages may not be facilitated by the multicast data session because these control messages do not include elements of the tuple associated with the multicast data session. More specifically, multicast control messages such as Register Stop messages transmitted from RP 230 to DR 220 and Null Register messages transmitted from DR 220 to RP 230 may not include, for example, the source and destination ports used to perform the policy lookup.

Accordingly, in one implementation, network security device 225 may establish a multicast control session based on IP addresses associated with DR 220, RP 230, the PIM protocol identifier, and a range of arbitrary. In some implementations, an existing control session may correspond to the control session established by the network security device 225. In such implementations, the multicast data session may be linked to the existing control session. For example, a multicast control session may be identified as a parent node in a linked list, while the corresponding multicast data sessions may be identified as child nodes in the linked list.

Returning to FIG. 5, once the multicast data (child) and multicast control (parent) sessions have been established by network security device 225, the unicast Data Register packet may be forwarded to RP 230 (message 510). As described above, pursuant to the PIM-Sparse Mode specification, RP 230, upon successful receipt of the multicast data, may transmit a Register Stop control message destined for DR 220 to network security device 225 (message 515).

Network security device 225 may parse the Register Stop control message and determine whether it matches an existing security session. Because network security device 225 may establish (or link) a suitable multicast control session during processing of the unicast Data Register packet, network security device 225 may match the received Register Stop control message to the multicast control session. The Register Stop control message may be forwarded from network security device 225 to DR 220 (message 520).

As described above, DR 220 may periodically transmit Null Register control messages destined for RP 230 to network security device 225 (message 525). Null Register messages may inquire as to whether a multicast group associated with the multicast data has been set up on RP 230 or, for a previously established group, whether RP 230 is already receiving unencapsulated multicast data directly.

Network security device 225 may parse the Null Register control message and determine whether it matches an existing security session. Because network security device 225 may establish (or link) a suitable multicast control session during processing of the unicast Data Register packet, network security device 225 may match the received Null Register control message to the multicast control session. The Null Register control message may be forwarded from network security device 225 to RP 230 (message 530).

If either of these conditions queried in the Null Register control message are met, RP 230 may send another Register Stop message (not shown) to DR 220. This Register Stop control message may be handed by network security device 225 in the same manner as Register Stop message 520 described above. However, if the queried conditions are not met, the second Register Stop message may not be sent to DR 220. In this case, a timer maintained by DR 220 may expire and DR 220 may again begin transmitting encapsulated unicast Data Register messages to the RP 230.

Figure 6A:
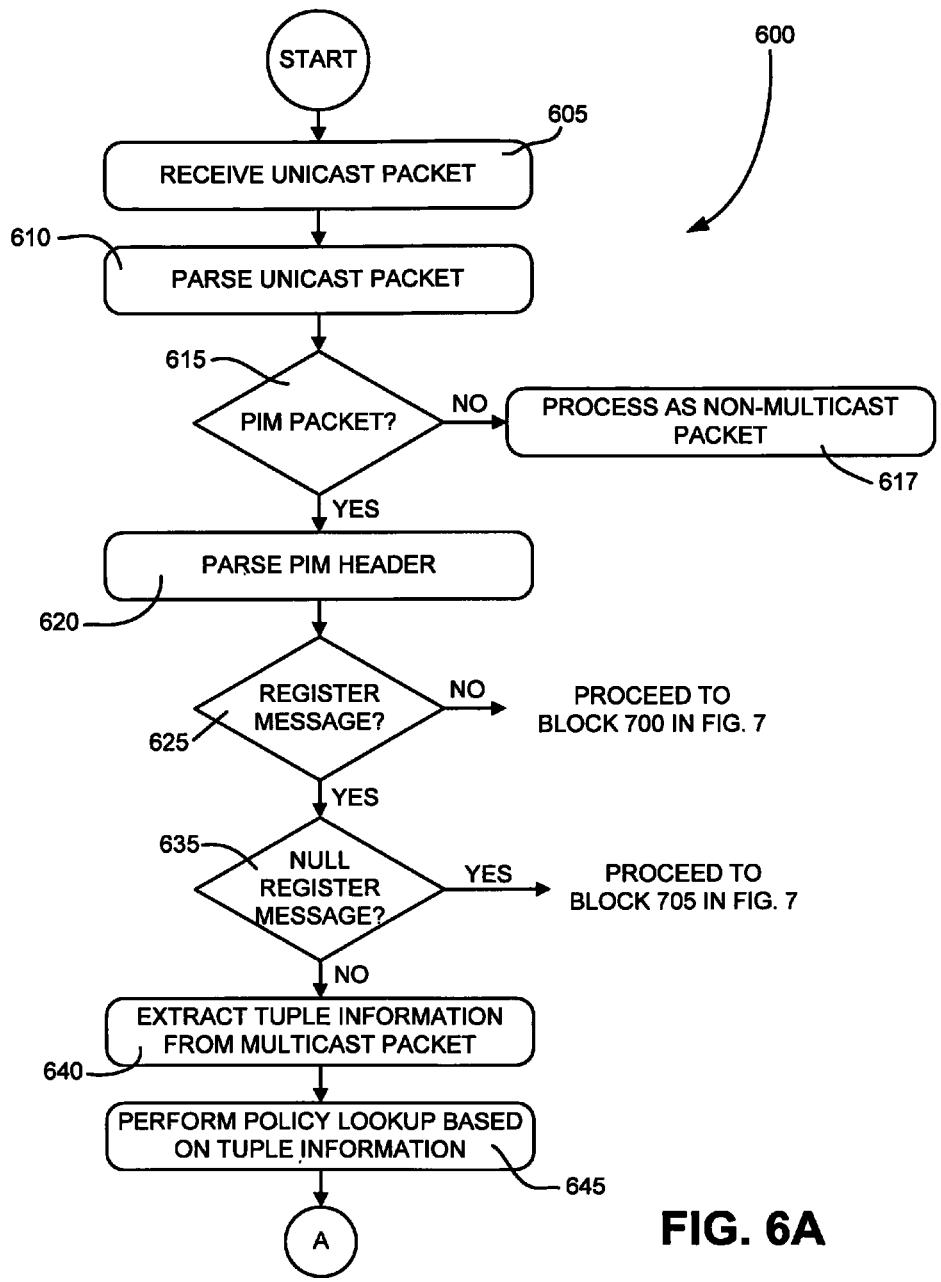
Figure 6B:
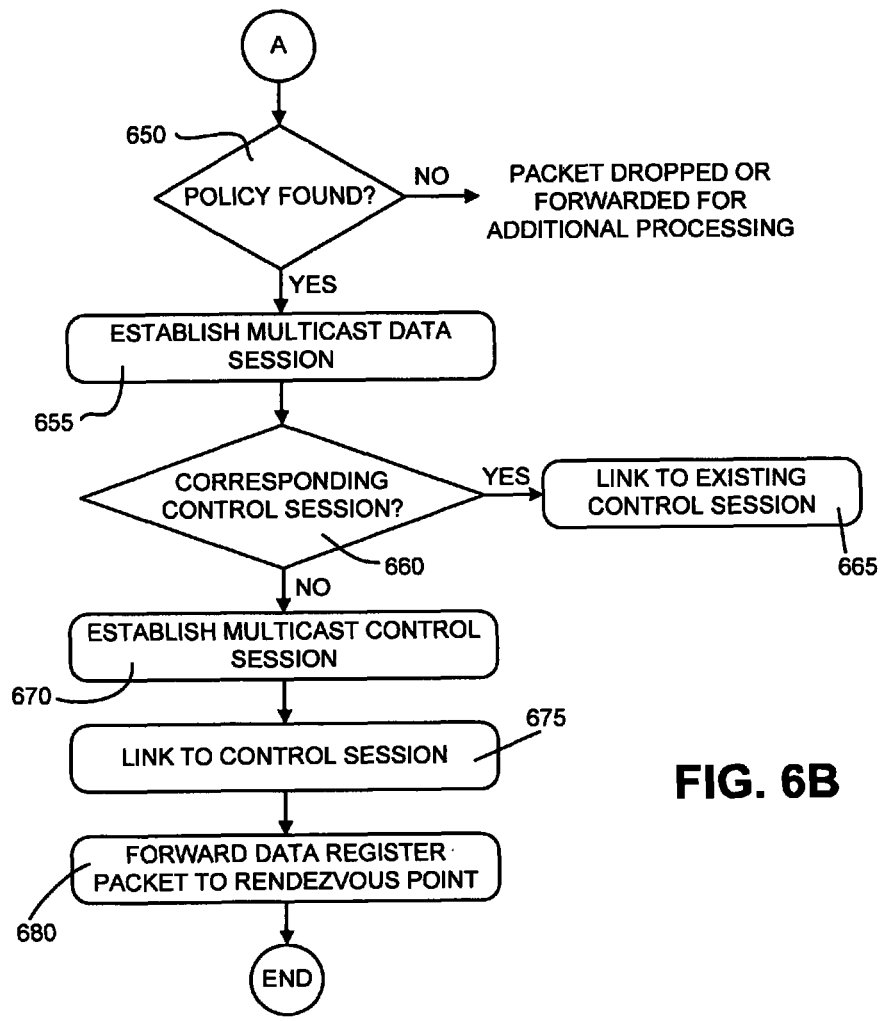

FIGS. 6A, 6B, and 7 are flow diagrams illustrating an exemplary process 600 for implementing security policies on multicast data and control messages, according to implementations described herein. The operations illustrated in FIGS. 6A, 6B, and 7 may generally be implemented with respect to the first packet in a session. The processes shown in FIGS. 6A, 6B, and 7 may not need to be performed on subsequent packets in the session. In one implementation, process 600 may be performed by network security device 225. In another implementation, some or all of process 600 may be performed by another device or group of devices, including or excluding network security device 225, such as, for example designated router 220, or rendezvous point 230.

As illustrated in FIG. 6A, process 600 may begin with network security device 225 receiving a unicast packet (block 605). For example, network security device 225 may receive a unicast packet from either DR 220 or RP 230. As described above, when DR 220 initially receives a multicast data packet (or fails to receive a Register Stop message within a predetermined time limit), a PIM header (indicating that the packet is a Data Register message) may be added to the received multicast packet and the multicast packet and PIM header may be encapsulated in a unicast packet having a new unicast IP header. Alternatively, network security device 225 may receiver other PIM-related unicast packets, such as Register Stop and Null Register messages.

Upon receipt of the unicast packet, network security device 225 may parse the unicast packet (block 610) and may determine whether the packet is a PIM-related unicast packet (615). If the received unicast packet is not a PIM-related packet (block 615—NO), network security device 225 may process the received unicast packet as a non-multicast packet (block 617). However, if network security device 225 determines that the received unicast packet is a PIM-related packet (i.e., that it includes a PIM header) (block 615—YES), network security device 225 may parse the PIM header (block 620) and may determine whether the PIM-related packet is a Register message (block 625).

If it is determined that the PIM-related packet is not a Register message (e.g., by determining that a Type field in the PIM header is any value other than 1) (block 625—NO), it may be determined whether the PIM-related packet is a Register Stop message. Details regarding the processing of a Register Stop message are provided below in connection with FIG. 7. If it is determined that the PIM-related packet is a Data Register message (block 625—YES), network security device 225 may determine whether the Register message is a Null Register message (block 635). As described briefly above, DR 220 may periodically transmit Null Register control messages destined for RP 230 to network security device 225 (e.g., message 525 in FIG. 5). Null Register messages may include Register messages in which a Null-Register bit is set to 1. If it is determined that the Register message is a Null Register message (block 635—YES), processing may proceed to block 705 in FIG. 7. However, if it is determined that the Register message is not Null Register message (block 635—NO), network security device 225 may extract tuple information included in the encapsulated multicast packet (block 640). In one implementation, the tuple information extracted from the unicast Register message may include source and destination IP address, source and destination ports, and the protocol type associated with the multicast packet encapsulated within the Register message.

Network security device 225 may perform a policy lookup based on the extracted tuple information (block 645). For example, network security device 225 may maintain a policy table designating security actions associated with packet flows matching one or more tuples of information. When the multicast tuple information has been extracted for a received Data Register message, network security device 225 may determine whether a corresponding security policy is found in the policy table. In one example, packets for which no security policy is found may be dropped by network security device 225.

As shown in FIG. 6B, it may then be determined whether a security policy authorizing transmission of the Data Register message has been identified (block 650). If not (block 650—NO), the received unicast packet may be dropped or forwarded for additional processing. If it is determined that a security policy authorizing transmission of the Data Register message has been identified (block 650—YES), network security device 225 may establish a multicast data session based on the tuple information extracted from the Data Register message (block 655).

Network security device 225 may determine whether a multicast control session corresponding to the established multicast data session has been previously established (block 660). As described above, a multicast control session may be considered to be a higher-level or parent session to the multicast data session, because it does not require specific source and destination ports. If a previously established multicast control session corresponding to the multicast data session is identified (block 660—YES), the multicast data session may be linked to the identified multicast control session (block 665). However, if a previously established multicast control session corresponding to the multicast data session is not identified or has not been established (block 660—NO), network security device 225 may establish the multicast control session (block 670) and may link the multicast control session to the multicast data session (block 675). In one embodiment, the multicast control session may be dissolved upon dissolution of any multicast data session linked thereto. The unicast Data Register packet may then be forwarded to RP 230 (block 680).

In another implementation, rather than extracting the multicast packet information from the received PIM-related packet (e.g., as in block 640), network security device 225 may strip or remove PIM header 325 and unicast IP header 330 from received packet 320. The resulting multicast packet 300 may be processed as a received multicast packet and not as a unicast packet. Accordingly, any applicable multicast security policies may be looked up based on the stripped multicast packet and not based on information extracted from the unicast packet. Following policy lookup, processing may return to block 655 of FIG. 6B in the event that a policy authorizing transmission of the multicast data is identified.

FIG. 7 is a flow chart illustrating exemplary processing of non-Data Register Message PIM-related packets. This processing may include whether the PIM-related packet is a Register Stop message (block 700). In one embodiment, the determination of whether the PIM-related packet a Register Stop message may include determining whether the Type field in the PIM header is a two. As described above, Register Stop messages may be transmitted from RP 230 to DR 220 upon receipt of a proper Data Register message associated with an existing multicast group.

If it is determined that the PIM-related packet is not a Register Stop message (block 700—NO), network security device 225 may forward the packet for additional PIM-related processing (block 703). However, if it is determined that the PIM-related packet is a Register Stop message (block 700—YES) or that the received unicast packet is a Null Register message (from block 635—YES in FIG. 6A), network security device 225 may parse the Register Stop or Null Register message (block 705) and may determine whether it matches an established multicast control session (block 710). For example, identification information relating to RP 230 and DR 220 may be identified from the Register Stop or Null Register message. As described above, multicast control sessions may be established by network security device 225 upon receipt and identification of an authorized Data Register message (as illustrated at block 670 in FIG. 6B).

If it is determined that the received Register Stop or Null Register message does not match an established multicast control session (block 710—NO), the received packet may be dropped or otherwise processed (block 715). However, if it is determined that the received Register Stop or Null Register message matches as established multicast control session (block 710—YES), the received packet may be forwarded to the destination designated in the received unicast packet (block 720).

By providing a mechanism in which encapsulated multicast data packets may be processed to identify security policies applying to the encapsulated packets as well as used to established a corresponding higher level multicast control session, network security and efficiency may be optimized for multicast traffic.

CONCLUSION

Systems and/or methods described herein may facilitate inspection of PIM-Sparse Mode Data Register messages, application of security policies, and creation of multicast data sessions based thereon. The systems and/or methods may further enable the creation of control-level security sessions linked to the multicast data sessions, such that PIM-related control messages associated with authorized multicast data may be similarly authorized.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6A, 6B, and 7, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving a unicast packet designating a unicast source and a unicast destination;
   determining whether the unicast packet is a Data Register message;
   identifying information relating to a multicast packet embedded within the unicast packet when the unicast packet is a Data Register message,
      identifying the information relating to the multicast packet including extracting, from the multicast packet, information that includes:
         a source Internet Protocol (IP) address associated with the multicast packet,
         a multicast group destination IP address associated with the multicast packet,
         a protocol identifier associated the multicast packet,
         a source port associated with the multicast packet, and
         a destination port associated with the multicast packet;
   performing a security policy lookup, based on the extracted information, to identify a security policy associated with the multicast packet;
   determining whether the identified security policy authorizes forwarding of the unicast packet;
   establishing a multicast data session when the identified security policy authorizes forwarding of the unicast packet; and
   forwarding the unicast packet to the unicast destination based on establishing the multicast data session.

2. The method of claim 1, where the unicast packet is received from a network device associated with a multicast source; and
   where the unicast source identifies the network device and the unicast destination identifies another network device associated with the multicast packet.

3. The method of claim 1, where determining whether the unicast packet is a Data Register message comprises:
   determining whether the unicast packet is a Protocol Independent Multicast (PIM)-related packet;
   identifying a value in a Type field, in a PIM-header associated with the unicast packet, when the unicast packet is a PIM-related packet; and
   determining that the unicast packet is a Data Register message when the value in the Type field is a one.

4. The method of claim 3, where the unicast packet is processed as a non-multicast packet when the unicast packet is not a PIM-related packet.

5. The method of claim 1, where the security policy is stored in a memory that stores security policies, and
   where the security policies are identified based on information associated with flows of packets.

6. The method of claim 1, where the security policy is identified based on a hash value corresponding to the extracted information.

7. The method of claim 1, where identifying the information relating to the multicast packet embedded within the unicast packet further comprises:
   removing unicast header information and Protocol Independent Multicast (PIM) header information associated with the unicast packet to obtain the multicast packet; and performing the security policy lookup based on the obtained multicast packet.

8. The method of claim 1, further comprising:
establishing a multicast control session based on the multicast data session,
where the multicast control session authorizes transmission of Protocol Independent Multicast (PIM)-related control messages associated with the multicast packet.

9. The method of claim 8, where the multicast control session is established based on:
information identifying a first network device that is associated with a multicast source, and
information identifying a second network device associated with the multicast packet,
the second network device being different than the first network device.

10. The method of claim 8, further comprising:
determining whether the unicast packet is a Register Stop message or a Null Register message;
determining whether the multicast control session authorizes forwarding of the unicast packet when the unicast packet is a Register Stop message or a Null Register message; and
forwarding the unicast packet when the multicast control session authorizes forwarding of the unicast packet when the unicast packet is a Register Stop message or a Null Register message.

11. The method of claim 10, where, when the unicast packet is a Register Stop message, determining whether the multicast control session authorizes forwarding of the unicast packet comprises:
parsing the Register Stop message to extract values associated with:
a source associated with the Register Stop message,
a destination associated with the Register Stop message, and
a protocol type associated with the Register Stop message;
determining whether the extracted values match the multicast control session; and
determining whether the multicast control session authorizes forwarding of the unicast packet when the extracted values match the multicast control session.

12. A device comprising:
a first interface to receive a unicast packet designating a unicast source and a unicast destination;
a processor to:
determine whether the unicast packet is a Data Register message,
the Data Register message comprising a multicast packet encapsulated within the unicast packet,
extract packet flow information relating to the multicast packet when the unicast packet is a Data Register message,
the packet flow information identifying a flow associated with the multicast packet,
perform a policy lookup based on the packet flow information,
determine, based on performing the policy lookup, whether a policy, associated with the multicast packet, has been identified,
drop the unicast packet when no policy, associated with the multicast packet, has been identified, and
when a policy associated with the multicast packet has been identified:
determine whether the identified policy authorizes forwarding of the unicast packet, and
establish a multicast data session when the identified policy authorizes forwarding of the unicast packet; and
a second interface to forward the unicast packet to the unicast destination when the multicast data session is established.

13. The device of claim 12, where the Data Register message is received from a designated network device associated with a multicast source,
where the unicast source identifies the designated network device and the unicast destination designates a rendezvous point associated with the multicast packet, and
where the unicast packet is received from the designated network device and the unicast packet is forwarded to the rendezvous point.

14. The device of claim 13, where the designated network device is included in a first network and the rendezvous point is included in a second network different from the first network.

15. The device of claim 12, where, when determining whether the unicast packet is a Data Register message, the processor is further to:
determine whether the unicast packet is a Protocol Independent Multicast (PIM)-related packet that includes a PIM-header,
identify a value in a particular field, in the PIM-header, when the unicast packet is a PIM-related packet, and
determine that the unicast packet is a Data Register message based on the value in the particular field.

16. The device of claim 12, where the processor is further to:
determine whether a multicast control session, corresponding to the multicast data session, has been established,
where, when the multicast control session, corresponding to the multicast data session, has been established, the multicast control session authorizes transmission of Protocol Independent Multicast (PIM)-related control messages associated with the multicast packet, and
establish a particular multicast control session when the multicast control session, corresponding to the multicast data session, has not been established,
where the particular multicast control session authorizes transmission of Protocol Independent Multicast (PIM)-related control messages associated with the multicast packet.

17. The device of claim 16, where the processor is further to:
determine whether the unicast packet is a Register Stop message or a Null Register message,
determine whether the multicast control session authorizes forwarding of the unicast packet when the unicast packet is a Register Stop message or a Null Register message, and
forward the unicast packet when the multicast control session authorizes forwarding of the unicast packet when the unicast packet is a Register Stop message or a Null Register message.

18. A system, comprising:
a network security device to:
receive, from a first network device, a unicast packet destined for a second network device,
the first network device being associated with a multicast source provided in a first network, and the second network device being associated with a multicast group provided in a second network that is different than the first network;

determine whether the received unicast packet is a Data Register message;

extract information relating to a multicast packet encapsulated within the unicast packet, when the unicast packet is a Data Register message, the extracted information including:

information identifying a source Internet Protocol (IP) address associated with the multicast packet, information identifying a multicast group destination IP address associated with the multicast packet, information identifying a source port associated with the multicast packet, information identifying a multicast group destination port associated with the multicast packet, and information identifying a protocol associated with the multicast packet;

perform a security policy lookup based on the extracted information relating to the multicast packet to identify a security policy associated with the multicast packet;

determine whether the identified security policy authorizes forwarding of the unicast packet;

establish a multicast data session when the identified security policy authorizes forwarding of the unicast packet;

establish a multicast control session based on the multicast data session, the multicast control session authorizing transmission of Protocol Independent Multicast (PIM)-related control messages associated with the multicast packet; and forward the unicast packet to the second network device based on establishing the multicast data session.

19. The system of claim 18, where the first network device comprises a designated device, where the second network device comprises a rendezvous point associated with the multicast packet, and where the network security device is further to:

determine whether a particular multicast control session, corresponding to the multicast data session, has been established prior to establishing the multicast control session, where the multicast control session is established when the particular multicast control session has not been established.

20. The system of claim 18, where, when determining whether the unicast packet is a Data Register message, the network security device is to:

determine whether the unicast packet is a Protocol Independent Multicast (PIM)-related packet that includes a PIM-header, identify a value in a particular field, in the PIM-header, when the unicast packet is a PIM-related packet, and determine that the unicast packet is a Data Register message when the value, in the particular field, is a particular value.

\* \* \* \* \*